Jan. 16, 1968  K. SVEN-OLOV REFTMARK  3,364,332
ARRANGEMENT IN MICROWAVE STOVES
Filed March 8, 1965  2 Sheets-Sheet 1

INVENTOR.
KARL SVEN-OLOV REFTMARK
BY
Frank R. Infani
AGENT

United States Patent Office 3,364,332
Patented Jan. 16, 1968

3,364,332
ARRANGEMENT IN MICROWAVE STOVES
Karl Sven-Olov Reftmark, Danderyd, Sweden, assignor to North American Philips Company, Inc., New York, N.Y., a corporation of Delaware
Filed Mar. 8, 1965, Ser. No. 437,790
Claims priority, application Sweden, Mar. 20, 1964, 3,486/64
6 Claims. (Cl. 219—10.55)

ABSTRACT OF THE DISCLOSURE

A microwave heating oven includes a wall structure that defines a heating chamber. The wall structure has first and second openings therein for supplying high frequency energy to the chamber. First and second field stirrers are rotatably mounted within the chamber in the vicinity of the first and second openings, respectively. The field stirrers are rotated at different speeds to produce a more uniform energy distribution within the heating chamber.

---

The present invention relates to a microwave stove having a heating cavity which is energized from a high frequency source by means of a wave guide connection. In microwave stoves of this type it is difficult to achieve an even energy distribution within the cavity depending upon the appearance of standing waves within the same. In order to solve this problem, it is necessary to alter the field pattern as much as possible within the stove in order to prevent the formation of areas of pronounced energy maxima and minima. Thus it is known to use so called stirrers for this purpose, i.e. a periodically movable body arranged within the cavity for influencing the field pattern therein. The periodic change of the field pattern in the cavity resulting therefrom gives rise to an improved energy distribution. However, under unfavourable loading conditions the energy variations between different parts of the stove can still be appreciable when using these known stirrers.

An object of the invention is to further improve the energy distribution in a microwave stove of the described kind. This improved energy distribution is achieved by means of a novel apparatus comprising a wave guide connection that is divided into two branches, each of which leads to an energy feed opening in a wall of the cavity. A field stirrer is positioned within the cavity in front of each energy feed opening. Each stirrer comprises an inclined reflecting disk provided with means for periodically changing its position relative to the energy feed opening, the time period of said movement being different for the two stirrers.

Due to the fact that the high frequency energy is supplied to the heating cavity through two openings, and that in front of each such opening there is arranged a stirrer in the shape of an inclined reflecting disk which, on the one hand, has the function of changing the resonance frequency of the cavity and on the other hand to reflect the incoming energy in different directions, and also to a certain degree to change the loading of the high frequency source and thereby its frequency, and due to the fact that the periodic variation of the position of the two stirrers is effected with different speeds, the oscillations produced within the cavity will result in a field which varies in an unregular way. As a result, a substantially uniform energy distribution is produced within the cavity, as counted over a certain time interval.

Figure 1:
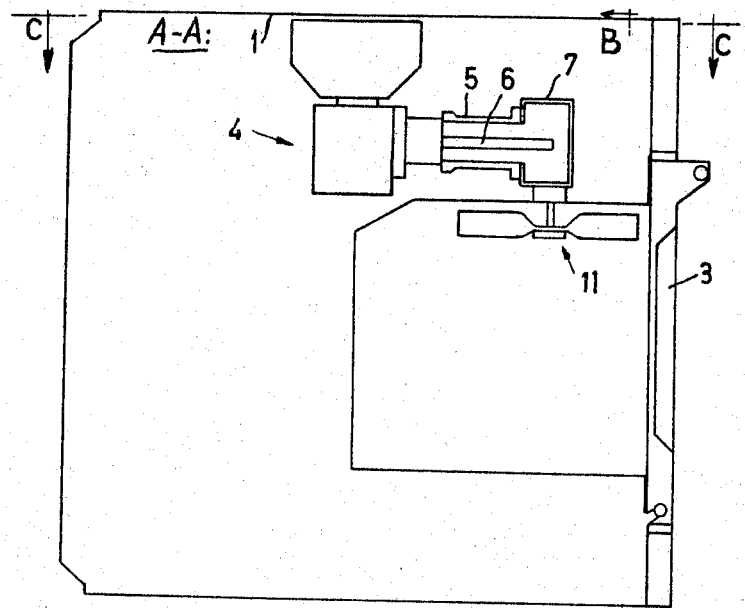
Figure 2:
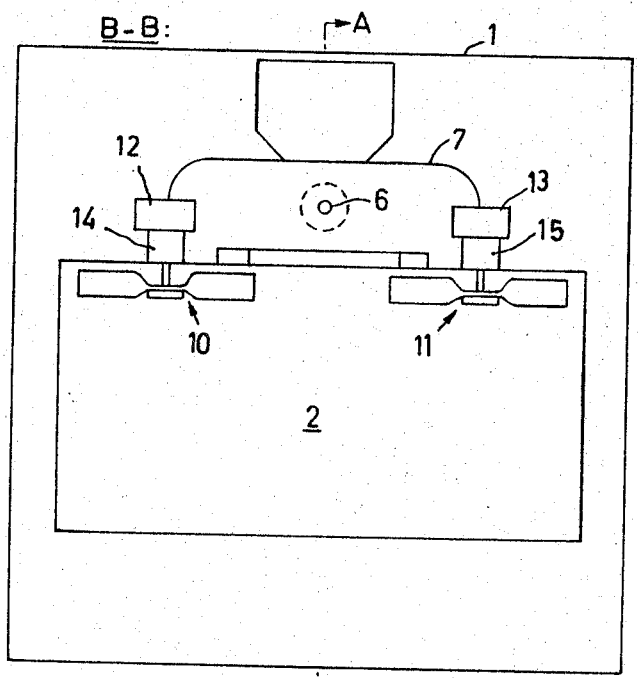
Figure 3:
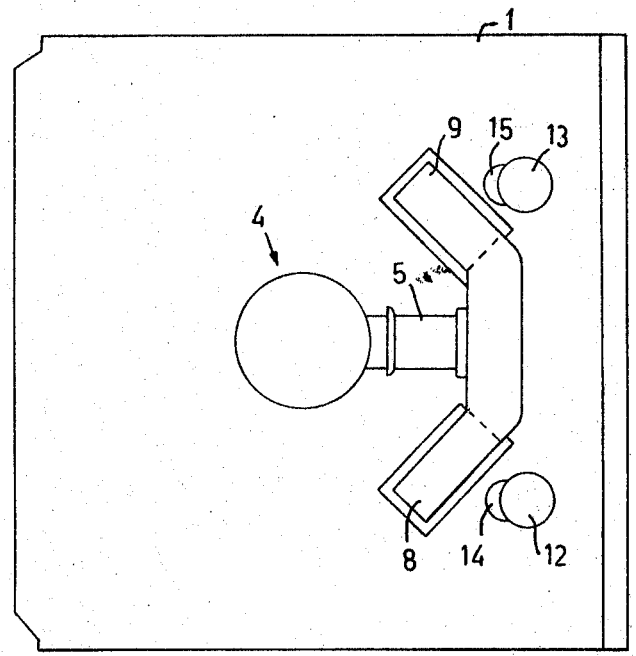
Figure 4:
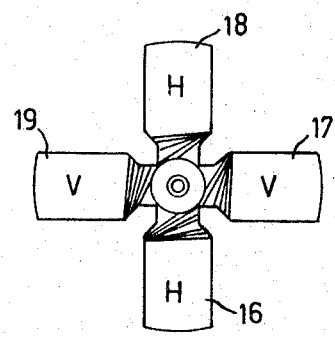

The invention is now explained more fully in connection with the accompanying drawing in which:

FIGS. 1–3 show three perpendicular sectional views of a microwave stove with an arrangement according to the invention, FIG. 4 shows a plan view of a stirrer used in the microwave stove according to FIGS. 1–3, and FIG. 5 shows an end view of a wing of the stirrer.

In FIGS. 1–3, in which only those details which are required for an understanding of the invention are shown, reference numeral 1 designates the outer housing of a microwave stove. The stove has a heating cavity 2 which can be closed by means of a door 3. A magnetron 4 has its output connected to a coaxial line 5 terminating at the middle of one side wall of a rectangular wave guide 7. The central lead 6 of the coaxial line projects a small distance into the rectangular wave guide 7 and serves as an antenna at the connection between the coaxial line and the rectangular wave guide. The high frequency energy from the magnetron is thereby divided into two substantially equal portions appearing in the two branches formed by the said rectangular wave guide 7. The ends of the wave guide 7 are curved downwards at an angle of 90° against the upper side wall of the heating cavity and terminate into energy feed openings 8 and 9 in the said side wall. The wave guide is furthermore shaped such that the openings make an angle of substantially 45° with the side walls of the cavity.

A pair of field stirrers 10 and 11 are arranged within the cavity in the proximity of each energy feed opening. The stirrers 10 and 11 have inclined blades arranged upon a rotatable shaft driven by synchronous motors 12 and 13, respectively, through gear reduction devices 14 and 15, respectively. The gear devices 14 and 15 have different reduction relationships so that the two stirrers 10, 11 will rotate with different speeds. The blades are long enough so that upon rotation of the supporting shaft they will be brought in successive order into a position in front of their respective opening. The rotation speed may be of a magnitude of approximately 1 revolution/sec.

Figure 5:
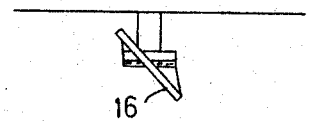

According to FIGS. 4 and 5, each stirrer comprises four blades 16–19 made of a sheet material of, for example, aluminium, by bending the same at an angle of 45°. The blades are then bent such that one pair of blades is bent to the right (16 and 18) and the other pair is bent to the left (17 and 19). As a result of this construction, the passage of the stirrer blades in front of the energy feed openings will alternately reflect the energy in forward and backward directions as seen in the movement direction of the blades at the same time as the rotation movement of the blades will bring the reflected energy to make a sweep within the cavity.

Due to the fact that the stirrers are driven at different speeds, and independently of each other, the said stirrers will automatically be set at random in a very large number of mutual setting combinations. Each setting combination corresponds to a predetermined resonance frequency of the heating cavity. This resonance frequency, which is one of the factors influencing the field pattern in the cavity, will therefore vary in an irregular way. This is one of the main causes of the good energy distribution produced by the arrangement. Another contributing factor to the improved energy distribution is that stirrers of the described shape, including blades inclined at a 45° angle, will in certain positions reflect energy against each other which gives rise to a further mixing of the resulting field.

What is claimed is:

1. A microwave oven comprising a metallic wall structure defining a heating chamber, said wall structure having first and second openings therein, means for supplying high-frequency electromagnetic energy to said chamber via said first and second wall openings, first and second field stirrers composed of energy reflecting material and positioned within said chamber in the vicinity of said first and second openings, respectively, and means for moving said first and second stirrers at different rates so as to periodically change the position of said first and second stirrers relative to the respective first and second wall openings.

2. An oven as described in claim 1 wherein said energy supply means comprises a waveguide structure having first and second branches coupled to said first and second openings, respectively, and a source of high-frequency energy coupled to the input of said waveguide structure, each of said stirrers comprising a plurality of inclined blades fixed to a rotatable shaft, and said moving means comprises a motor coupled to the stirrer shafts.

3. A microwave oven comprising a metallic wall structure defining a heating chamber, said wall structure having first and second openings therein, waveguide means having first and second branches coupled to said first and second wall openings, a source of microwave energy coupled to the input of said waveguide means, first and second rotatable field stirrers positioned within said chamber in the vicinity of said first and second wall openings, respectively, so as to intercept a substantial portion of the microwave energy radiated from its respective wall opening, each of said stirrers including at least one inclined blade composed of energy reflecting material, and means for rotating said first and second stirrers at different rotational speeds.

4. An oven as described in claim 3 wherein each of said field stirrers comprises a plurality of blades fixed to a rotatable shaft, alternate ones of said blades being inclined in opposite directions, and wherein said rotating means is adapted to rotate said first and second stirrers independently of one another.

5. An oven as described in claim 3 wherein each of said field stirrers comprises a plurality of blades fixed to a rotatable shaft, alternate ones of said blades being inclined in opposite directions at an angle of 45 degrees relative to the direction of propagation of microwave energy through the corresponding wall opening.

6. A microwave oven comprising a conductive wall structure defining a heating enclosure, said wall structure having first and second openings in one wall thereof, a source of microwave energy, waveguide means for coupling said energy source to said enclosure including first and second branches coupled to said first and second wall openings, respectively, first and second rotatable field stirrers positioned entirely within said enclosure in the vicinity of said first and second wall openings, respectively, each of said field stirrers comprising a plurality of inclined blades radially fixed to a rotatable shaft, and means coupled to said stirrer shafts for imparting continuous rotary motion thereto at different speeds.

References Cited

UNITED STATES PATENTS 2,813,185    11/1957    Smith _____ 219—10.55
2,895,828    7/1959    Kamide _____ 219—10.55 X

FOREIGN PATENTS 1,378,280    10/1964    France.

RICHARD M. WOOD, *Primary Examiner.*

L. H. BENDER, *Assistant Examiner.*